Oct. 15, 1963 J. DOBBIE 3,107,306
ANTICOINCIDENT PULSE RESPONSIVE CIRCUIT
COMPRISING LOGIC COMPONENTS
Filed July 1, 1959 2 Sheets-Sheet 1

WITNESSES
John E. Healy, Jr.
James F. Young

INVENTOR
James Dobbie
BY R.J. Brodahl
ATTORNEY

| | OUTPUT SIGNALS FROM NOR LOGIC ELEMENTS | | | | | | | | | | | | |
|---|---|---|---|---|---|---|---|---|---|---|---|---|---|
| | 60 | 62 | 60' | 62' | 210 | 212 | 214 | 102 | 104 | 106 | 102' | 104' | 106' |
| "0" SIGNAL ON INPUT 1 AND "0" SIGNAL ON INPUT 2 | 1 | 0 | 1 | 0 | 0 | 1 | 0 | 1 | 0 | 0 | 1 | 0 | 0 |
| "1" APPLIED ON 1 AND "0" REMAINS ON 2 | 0 | 1 | 1 | 0 | 0 | 1 | 0 | 0 | 0 | 1 | 1 | 0 | 0 |
| "0" RETURNS AT 1 AND "0" REMAINS AT 2 | 1 | 0 | 1 | 0 | 0 | 1 | 0 | 0 | 1 | 0 | 1 | 0 | 0 |
| "0" REMAINS AT 1 AND "0" REMAINS AT 2 | 1 | 0 | 1 | 0 | 0 | 1 | 0 | 1 | 0 | 0 | 1 | 0 | 0 |
| "0" REMAINS AT 1 AND "1" APPLIED AT 2 | 1 | 0 | 0 | 1 | 0 | 1 | 0 | 1 | 0 | 0 | 0 | 0 | 1 |
| "0" REMAINS ON 1 AND "0" RETURNS ON 2 | 1 | 0 | 1 | 0 | 0 | 1 | 0 | 1 | 0 | 0 | 0 | 1 | 0 |
| "0" REMAINS ON 1 AND "0" REMAINS ON 2 | 1 | 0 | 1 | 0 | 0 | 1 | 0 | 1 | 0 | 0 | 1 | 0 | 0 |
| "1" APPLIED ON 1 AND "1" APPLIED ON 2 | 0 | 1 | 0 | 1 | 1 | 0 | 1 | 0 | 0 | 0 | 0 | 0 | 0 |
| "0" RETURNS ON 1 AND "0" RETURNS ON 2 | 1 | 0 | 1 | 0 | 0 | 0 | 1 | 1 | 0 | 0 | 1 | 0 | 0 |
| "0" REMAINS ON 1 AND "0" REMAINS ON 2 | 1 | 0 | 1 | 0 | 0 | 1 | 0 | 1 | 0 | 0 | 1 | 0 | 0 |

Fig. 3

3,107,306

ANTICOINCIDENT PULSE RESPONSIVE CIRCUIT COMPRISING LOGIC COMPONENTS

James Dobbie, Williamsville, N.Y., assignor to Westinghouse Electric Corporation, East Pittsburgh, Pa., a corporation of Pennsylvania Filed July 1, 1959, Ser. No. 824,392
6 Claims. (Cl. 307—88.5)

The present invention relates to pulse control apparatus in general and in particular to pulse anti-coincident control apparatus utilizing transistorized logic elements.

It is often necessary in digital computer applications to have a circuit which will detect and block or prevent output signals for coincident pulses occurring on two separate input lines and to pass through the circuit non-coincident pulses on these two respective input lines. Such a circuit is useful for example, as an input circuit to a differential pulse rate circuit. A differential pulse rate circuit gives an output on either of two lines which is equal to the difference in pulse rate between two sets of pulses occurring on respective input lines. When the input pulses on one line has the highest pulse rate, the corresponding output line should contain this difference and the other output line be zero and vice versa. However, most of the differential pulse rate circuits are not operative with coincident pulses occurring at their respective inputs or they will malfunction, thus an anti-coincident circuit can be used in combination with or as an input circuit for a pulse differential rate circuit.

Accordingly, it is an object of the present invention to provide an improved anti-coincident pulse control circuit.

It is another object of this invention to provide an anti-coincident pulse control circuit which utilizes transistorized logic elements and which will block or prevent output signals for coincident pulses on two input lines and pass the non-coincident pulses through to two respective output lines.

Further objects and advantages of the present invention will become apparent from the following description when taken in conjunction with the accompanying drawings, wherein:

FIG. 3 is an operation table to illustrate the operation of the pulse control apparatus shown in FIG. 2.

Figure 1:
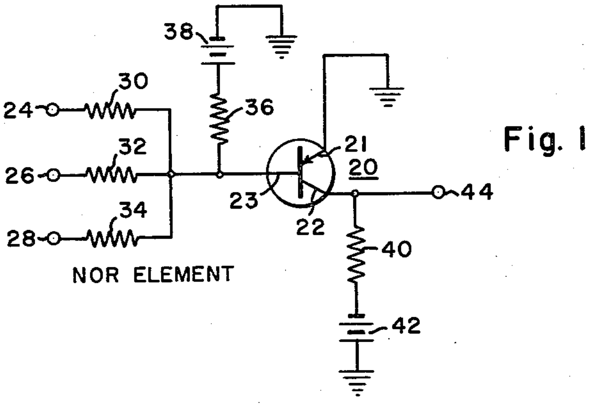
FIG. 1 is a schematic showing of a transistorized logic circuit to be utilized in the control apparatus of the present invention.

Referring to FIG. 1, the schematic diagram illustrates the use of a transistor 20 to perform a logic function commonly known to those skilled in the present art as the NOR logic function. A NOR logic function is performed by a circuit apparatus which has a first output voltage level arbitrarily considered a unit value, only if neither of its input A nor its input B nor its input C are energized by unit value input signals. If the logic function is performed in a binary system, then the NOR logic circuit or element has an output of unit or one value only if neither an input A nor an input B nor an input C is energized by a one value input signal; if any of the plurality of inputs to the NOR logic element is energized by a one value input signal, then the output of the logic element is a second voltage level, commonly referred to in a binary system as a zero value voltage level.

The transistor 20 of FIG. 1 includes a semi-conductive body and may for example be a 2N269 transistor having an emitter electrode 21, a collector electrode 22 and a base electrode 23. The emitter electrode 21 is connected to ground, the base electrode 23 is connected to a plurality of input terminals 24, 26 and 28 through their respective isolating impedances 30, 32 and 34 each having a value in the order of 10,000 ohms. The base electrode 23 is connected through a resistor 36 having a value of 47,000 ohms to a B+ bias supply 38 of 25 volts, the collector electrode 22 is connected through a current limiting resistor 40 having a value of 2,700 ohms, to a B— voltage supply source 42 of —25 volts. The collector electrode 22 is also connected to an output terminal 44.

In operation, the B+ bias supply 38, biases the transistor 20 to cutoff through the resistor 36. Thusly when there are no input signals at any of the terminals 24, 26 and 28, the transistor 20 is cutoff or made non-conductive and an output signal of one value will appear at the terminal 44 which will be approximately the voltage value of the B— supply 42. If a negative one value input pulse sufficient in magnitude to drive the transistor 20 to a fully saturated condition is applied to one of the input terminals 24, 26 and 28, the transistor 20 will conduct through its emitter 21 and collector 22 circuit and there will be no one value output signal at the terminal 44. Therefore, it may be seen that the apparatus illustrated in FIG. 1 performs the NOR logic function as hereinbefore described, that is, when a one value negative input pulse is present at any one of the input terminals 24, 26 and 28, the output signal at the terminal 44 will be of zero value. If no such one value input signals are present at any of the terminals 24, 26 and 28 the output signal at the terminal 44 will be of "one" value.

Although the apparatus of FIG. 1 is shown as utilizing a p-n-p type of transistor, and n-p-n type of transistor may be utilized if the polarity of the bias voltage, the supply voltage and the input signals are reversed.

For a further description of the operation and characteristics of a NOR logic element, such as the one shown in FIG. 1, reference is made to a copending application, Serial No. 628,332 entitled "NOR Elements for Control Systems," filed December 14, 1956, and assigned to the same assignee as the present invention.

Figure 2:
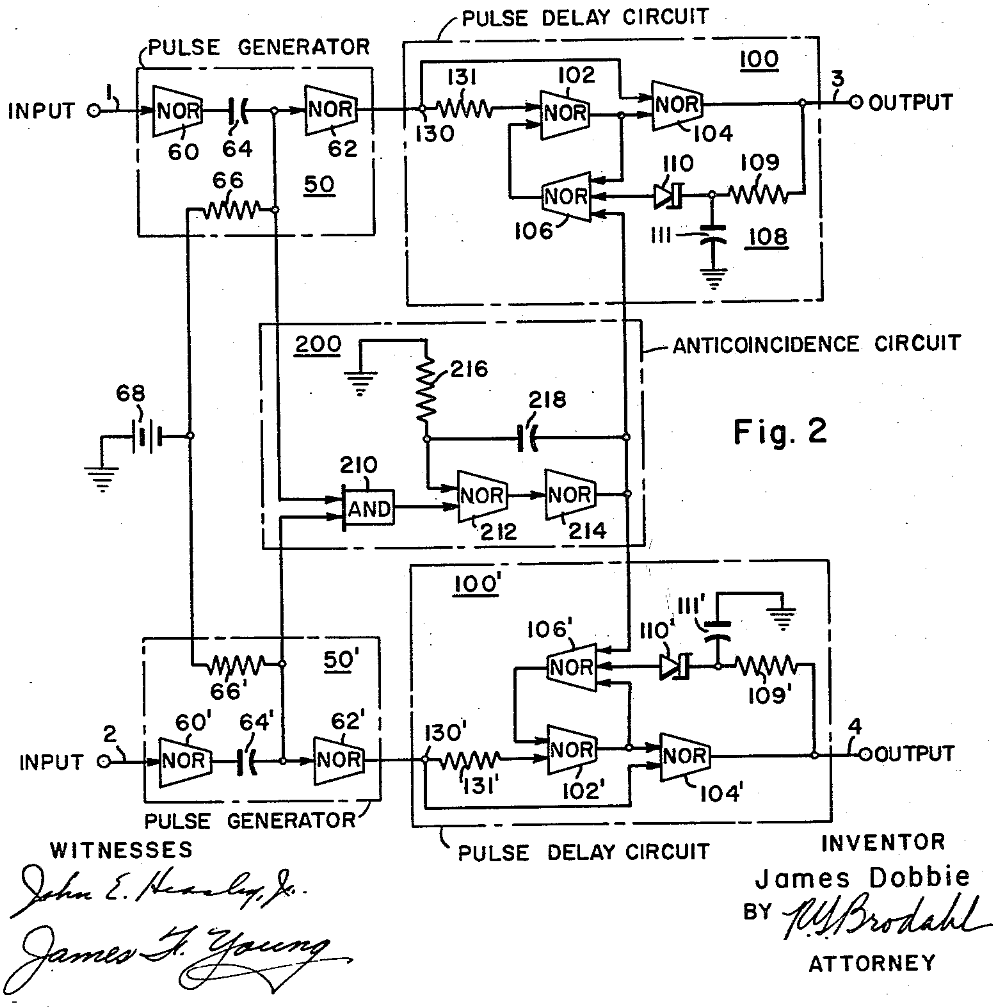
FIG. 2 is a showing of anti-coincident control apparatus embodying the logic circuits of FIGURE 1 and in accordance with the teachings of the present invention.

Referring to FIG. 2, there is shown an anti-coincidence control apparatus embodying the teachings of the present invention and utilizing NOR logic elements as schematically shown in FIG. 1. The apparatus of FIG. 2 comprises in general, input lines 1 and 2 feeding into respective pulse generator circuits 50 and 50′. The pulse generating circuits 50 and 50′ feed into respective pulse delay circuits 100 and 100′, the output signals of which are supplied to output lines, 3 and 4 respectively. A pulse coincidence control circuit 200 driven by pulses from the respective pulse generating circuits 50 and 50′ has an output which may block or prevent the gating of the pulse delay circuits 100 and 100′ in response to coincident input pulses supplied to the input lines, 1 and 2, as will be later explained in greater detail.

The pulse generating circuits 50 and 50′ are similar regarding the components of both circuits, and they have the same reference characters, with the corresponding reference characters of the pulse generating circuit 50′ components being indicated by the primes on the identifying numerals.

The pulse generating circuit 50 includes a NOR logic circuit or element 60 and a NOR logic circuit or element 62, the input line 1 is connected to the input of the NOR logic element 60, the output of the NOR logic element 60 is connected through a capacitor 64 to the input of the NOR logic element 62. The output of the NOR logic element 62 is the output signal of the NOR pulse generating circuit 50 and is connected to an input terminal 130 of the pulse delay circuit 100.

The function of the pulse generating circuit 50 is such that in response to a one value input signal pulse coming in on the input line 1, the input signal pulse generates by its leading edge, a pulse of definite duration and independent of, but always less than the duration of that input pulse supplied to the input line 1. As hereinbefore described, when a NOR element receives a one value signal on any of a plurality of inputs, it ceases to provide a one value output signal, such that, the output condition of the NOR element changes from a one value output signal to a zero value output signal. The leading edge of the input pulse applied to the input line 1, causes the NOR element 60 to no longer have an output signal, then the capacitor 64 discharges through the resistor 66 until its voltage no longer holds the NOR element 62 in its off condition of operation such that the NOR element 62 now provides a one value output signal. When the input pulse supplied to the input line 1 disappears, the NOR element 60 again has an output one signal which switches off the NOR element 62 to terminate its one output signal and thusly terminate the one value output pulse generated by the circuit 50.

The resistor 66 is connected to a B— bias voltage supply 68. The magnitude of the output pulse generated by the NOR logic element 62 is determined by the collector voltage on the NOR logic element 60 and 62, and the time duration is controlled by the time constant of the resistor 66 and capacitor 64 circuit combination and the switching voltage level of the NOR logic element 62. The resistor 66 should preferably be made much smaller in value than the input resistance of the NOR logic element 62.

The operation table set forth in FIG. 3 illustrates the output signals provided by the NOR logic elements included in FIG. 2, depending upon the input signals applied to the respective input lines 1 and 2. There follows a more general description in accordance with the operation table shown in FIG. 3.

The operation of the pulse generating circuit 50′ is substantially the same as the above described operation of the pulse generating circuit 50, such that a one value input pulse signal applied to the input line 2 will similarly result in a one value control pulse being generated by the NOR element 62′ and supplied to the input terminal 130′ of the pulse delay circuit 100′.

Referring now to the pulse delay circuits 100 and 100′, it should be apparent that the two circuits are substantially the same and have like components. The similar reference characters of the pulse delay circuit 100′ are primed in this regard.

A first NOR logic element 102 is connected to receive the one value control pulse from the output of the NOR element 62. A second NOR logic element 104 has its input connected to the output of the NOR element 102, and a feedback NOR logic element 106 is connected between the output of the NOR element 104 and an input of the NOR element 102. The input terminal 130 is connected through a resistor 131 to the input of the NOR element 102. The input terminal 130 is also directly connected to a second input of the NOR element 104. The output of the NOR logic element 102 is also connected to an input of the feedback NOR logic element 106. The output one value signal of the NOR logic element 104 is connected to the output conductor 3 which is the output of the pulse delay circuit 100. The output of the NOR element 104 as above mentioned is connected through a resistor capacitor circuit 108 and a Zener type semiconductor diode 110 in the reverse direction to an input of the feedback NOR element 106.

In operation, when a negative one value pulse appears at the input terminal 130 the NOR element 102 is made operative in a zero output signal state of operation by the receipt of this negative one value input pulse on one of its inputs. The negative input pulse at the terminal 130 also is applied to an input of the NOR element 104 to hold its output at a zero value. The resistor 131 delays the application of the input signal to the NOR element 102 until after the input signal has additionally blocked or prevented a one output signal from the NOR element 104, thusly when the output of the NOR element 102 changes from a one value to a zero value the output of the NOR element 104 remains at its zero value.

When the output of the NOR element 102 changes from a one value to a zero value, the applied one value signal therefrom to the NOR element 106 is removed allowing the NOR element 106 to provide a one value output signal which is applied to a second input of the first NOR element 102.

When the negative input pulse at the terminal 130 changes back to a zero value, the output signal of the NOR element 102 remains at a zero value because of the one value input from the feedback NOR element 106. However, when the input pulse is removed from the input terminal 130 the NOR element 104 has its output state changed from a zero value to a one value because now there is no input signal supplied to the NOR element 104 at either of its inputs. The resistor and capacitor circuit 108 which can include a series resistor 109 and a parallel capacitor 111 now stores energy from the output signal of the NOR element 104 in the capacitor 111 until the breakdown voltage of the Zener diode 110 is reached, and the latter diode 110 switches or breaks down in the reverse direction. The breakdown of this diode 110 allows an input one value pulse to be applied to an input of the NOR element 106 to change its output from a one value to a zero value. The removal of this one value input signal applied to an input of the NOR element 102, allows the latter NOR element to resume its steady state condition such that it again has a one value output signal, this puts the circuit of FIG. 2 in its original steady state condition and is ready to receive another input pulse at the terminal 130.

The discharge of the capacitor 111 through the Zener diode 110 in a reverse direction will eventually decay to a point below which the breakdown condition of the Zener diode can not be sustained. However, this does not happen until the NOR element 102 has reached its steady state one value output condition which places an input one signal at one input of the NOR element 106 to hold the latter NOR element in its steady state blocked or zero output signal condition.

Another feature of the delay circuit illustrated in FIG. 2, is that the output pulse supplied to the conductor line 3, can be blocked by a gating pulse applied to an input of the NOR element 106. The gating pulse applied to the latter input of the NOR element 106 maintains a zero value output from the NOR element 106, and this is operative to block or prevent an output pulse at the conductor 3 because, if an input one control pulse is applied at the terminal 130, the operation proceeds as previously described until this input pulse at the terminal 130 changes to zero. Under normal operations, the NOR element 102 would have remained at a zero value output state because of the one value input signal from the NOR element 106 and the NOR element 104 would have changed its output state from a zero value to a one value. However, with the output of the NOR element 106 maintained at a zero value, the NOR element 102 provides a one value output signal to an input of the NOR element 104 such that, a one value output pulse does not now appear at the output conductor 3 of the delay circuit shown in FIG. 2.

The coincidence circuit 200 shown in FIG. 2 includes an AND element 210, a NOR element 212 and a second NOR element 214. The AND logic element 210 has two inputs and an output, and the operation of the AND logic element is well known to those skilled in this art. However, in brief, an AND logic circuit provides an output signal when, and only when, all of its plurality of inputs are energized simultaneously. One input of the AND element 210 is supplied with an input pulse as generated by the pulse generator 50 in response to an input signal supplied to the input line 1. The second input of the AND element 210 is supplied with an input pulse generated by the pulse generator 50' in response to an input signal being supplied to the input line 2. The ouput of the AND element 210 is connected to one input of the NOR element 212, and the output of the NOR element 212 is connected to the input of the NOR element 214. The output of the latter NOR element 214 is connected through a feedback circuit including a resistor 216 and a capacitor 218 to a second input of the NOR element 212. The output of the NOR element 214 is also connected to supply a gating signal to the inputs of the respective NOR elements 106 and 106' in the pulse delay circuits 100 and 100'.

In the operation of the coincidence circuit 200 whenever there are coincident input pulses on the input lines 1 and 2, these are also provided simultaneously or in a coincident manner as control pulses to the respective inputs of the AND circuit 210. The AND circuit or element 210 then provides an output one signal to the NOR element 212, and the NOR element 212 has its output signal changed from a one value to a zero value by the latter output one signal from the AND element 210. This allows the output signal of the NOR element 214 to change from a zero value to a one value, and thusly presenting a gating signal to the inputs of the respective NOR elements 106 and 106' of the pulse delay circuits 100 and 100'. Also the output one signal from the NOR element 214 is fed back through the capacitor and resistor circuit to an input of the NOR element 212; the serially connected capacitor 218 and parallel connected resistance 216 causes the output one signal of the NOR element 214 to be maintained for a time interval greater than the time duration of the initial input control pulses applied to the inputs of the AND circuit 210. This time interval is determined by the time constant of the resistance and capacitor circuit and the input resistance of the NOR element 212. By varying this time constant an input control pulse received by the coincident circuit 200 can be effectively lengthened in this manner as desired. Therefore, the pulse delay circuits 100 and 100' are prevented from generating a delayed output pulse by the application of the output gating signal from the NOR element 214 to gate the inputs of the respective NOR elements 106 and 106'. In this manner, the control apparatus shown in FIG. 2 blocks or prevents output signals for coincidence pulses received on the respective input lines 1 and 2 and will pass non-concidence pulses received on the respective input lines 1 and 2.

Although the present invention has been described with a certain degree of particularly, it should be understood that the present disclosure has been made only by way of example and that numerous changes in the details of construction and the combination and arrangement of parts may be resorted to without departing from the scope and spirit of the present invention.

I claim as my invention:

1. In pulse control apparatus operative with input pulses supplied to first and second input circuits, the combination of a first pulse generator device for providing a first output pulse in response to an input pulse being supplied to said first input circuit, a second pulse generator device for providing a second output pulse in response to an input pulse being supplied to said second input circuit, a first pulse delay device operatively connected to said first pulse generator device for providing a first delayed output pulse for each of said first output pulses provided by said first pulse generator device, a second pulse delay device operatively connected to said second pulse generator device for providing a second delayed output pulse for each of said second output pulses provided by said second pulse generating device, and a pulse control device responsive to said first output pulse and said second output pulse for providing a control pulse when said first output pulse is substantially coincident relative to said second output pulse, with each of said first and second pulse delay devices being responsive to said control pulse for preventing the provision of their respective first and second delayed output pulses upon the occurrence of said control pulse.

2. In pulse control apparatus operative with input pulses supplied to first and second input circuits, the combination of a first pulse generator device operatively connected to one of said input circuits for providing a first output pulse for each of said input pulses supplied to said one input circuit, a second pulse generator device operatively connected to said first pulse generator device for providing a second output pulse for each of said first output pulses supplied by said first pulse generating device, and a pulse control device having a first input operatively connected to said first pulse generating device and a second input operatively connected to the other of said input circuits for providing a third output pulse when each of the latter first and second inputs are energized by substantially simultaneous pulses, with said second pulse generating device being operatively connected to said pulse control device and responsive to said third output pulse for blocking the provision of at least one of said second output pulses when said third output pulse is provided.

3. In pulse control apparatus operative with input pulses supplied to first and second input circuits, the combination of a first pulse generator device for providing a first output pulse for each of said input pulses supplied to said first input circuit, a second pulse generator device for providing a second output pulse for each of said input pulses supplied to said second input circuit, a first pulse delay device for providing a first delayed output pulse for each of said first output pulses provided by said first pulse generator device, a second pulse delay device for providing a second delayed output pulse for each of said second output pulses provided by said second pulse generating device, and a pulse control device responsive to each of said first output pulses and each of said second output pulses for providing a control pulse when one of said first output pulses is substantially coincident relative to one of said second output pulses, with at least one of said first and second pulse delay devices being responsive to said control pulse for preventing the provision of its respective delayed output pulses upon the occurrence of said control pulse.

4. In pulse control apparatus operative with input pulses supplied to first and second input circuits, the combination of a first pulse generator device operatively connected to one of said input circuits for providing a first output pulse in response to at least one of said input pulses supplied to said one input circuit, a second pulse generator device operatively connected to said first pulse generator device for providing a second output pulse in response to at least one of said first output pulses supplied by said first pulse generating device, and a pulse control device having a first input operatively connected to said first pulse generating device and a second input operatively connected to the other of said input circuits for providing a third output pulse when each of the latter first and second inputs are energized by substantially simultaneous pulses, with said second pulse generating device being operatively connected to said pulse control device and responsive to said third output pulse for blocking the provision of at least one of said second output pulses when said third output pulse is provided.

5. In pulse control apparatus operative with input pulses supplied to first and second input circuits, the combination of a first pulse generator device including at least one NOR element for providing a first output pulse in response to an input pulse being supplied to said first input circuit, a second pulse generator device including at least one NOR element for providing a second output pulse in response to an input pulse being supplied to said second input circuit, a first pulse delay device including at least one NOR element for providing a first delayed output pulse for each of said first output pulses provided by said first pulse generator device, a second pulse delay device including at least one NOR element for providing a second delayed output pulse for each of said second output pulses provided by said second pulse generating device, and a pulse control device responsive to each of said first output pulses and each of said second output pulses for providing a control pulse when at least one of said first output pulses is substantially coincident relative to at least one of said second output pulses, with at least one of said first and second pulse delay devices being responsive to said control pulse for preventing the provision of its respective delayed output pulses upon the occurrence of said control pulse.

6. In pulse control apparatus operative with input pulses supplied to first and second input circuits, the combination of a first pulse generator device operatively connected to one of said input circuits and including at least one NOR element for providing a first output pulse for each of said input pulses supplied to said one input circuit, a second pulse generator device operatively connected to said first pulse generator device and including at least one NOR element for providing a second output pulse for each of said first output pulses supplied by said first pulse generating device, and a pulse control device having a first input operatively connected to said first pulse generating device and a second input operatively connected to the other of said input circuits for providing a third output pulse when each of the latter first and second inputs are energized by substantially simultaneous pulses, with said second pulse generating device being operatively connected to said pulse control device and responsive to said third output pulse for blocking the provision of at least one of said second output pulses when said third output pulse is provided.

References Cited in the file of this patent

UNITED STATES PATENTS

| | | |
|---|---|---|
| 2,828,478 | Johnson | Mar. 25, 1958 |
| 2,830,179 | Stenning | Apr. 8, 1958 |
| 2,858,435 | Kuhn et al. | Nov. 8, 1958 |

OTHER REFERENCES

Pulse and Digital Circuits, by Millman and Taub, McGraw-Hill Co., 1956, page 421.